United States Patent
Huang

(10) Patent No.: US 6,873,423 B2
(45) Date of Patent: Mar. 29, 2005

(54) LENGTH MEASURE APPARATUS AND THE METHOD FOR MEASURING

(75) Inventor: Yi-Shih Huang, Taichung (TW)

(73) Assignee: Lih Rurng Instrument Trading Co., Ltd., Taichung (TW)

( * ) Notice: Subject to any disclaimer, the term of this patent is extended or adjusted under 35 U.S.C. 154(b) by 76 days.

(21) Appl. No.: 10/622,545

(22) Filed: Jul. 21, 2003

(65) Prior Publication Data

US 2005/0018211 A1 Jan. 27, 2005

(51) Int. Cl.$^7$ ............................................. G01B 11/06
(52) U.S. Cl. ........................... 356/634; 451/10; 33/200
(58) Field of Search ................................ 356/601–602, 356/634, 243.1, 243.3; 33/200, 459; 451/10–11, 5

(56) References Cited

U.S. PATENT DOCUMENTS

| | | | | |
|---|---|---|---|---|
| 4,638,568 A | * | 1/1987 | Umemura | ..................... 33/549 |
| 5,428,448 A | * | 6/1995 | Albert-Garcia | .............. 356/612 |
| 5,926,247 A | * | 7/1999 | Kimura | ......................... 351/41 |
| 5,967,879 A | * | 10/1999 | Gottschald | ...................... 451/5 |
| 5,973,772 A | * | 10/1999 | Fukuma et al. | .............. 356/124 |
| 6,381,012 B1 | * | 4/2002 | Yancy | ......................... 356/124 |

* cited by examiner

Primary Examiner—Gregory J. Toatley, Jr.
Assistant Examiner—Sang H. Nguyen
(74) Attorney, Agent, or Firm—Rosenberg, Klein & Lee

(57) ABSTRACT

A length measure apparatus and the method for measuring transform an image from a lens set into a digital contrast image via a central processing unit. The CPU has multiple standard lines that are previously set therein. Multiple movement controllers control a movement of a selected standard line from the CPU relative to the digital contrast image. A movement value is output when the selected standard line flushes with a profile of the contrast image. The measure value is shown on a monitor when the CPU contrasts the movement of the selected standard line.

7 Claims, 6 Drawing Sheets

LENGTH MEASURE APPARATUS AND THE METHOD FOR MEASURING

BACKGROUND OF THE INVENTION

1. Field of the Invention

The present invention relates to a length measure apparatus and the method for measuring, and more particularly to a length measure apparatus and the method for measuring that can overcome errors from the operator's vision and the measure apparatus.

2. Description of Related Art

A conventional profile projector in accordance with the prior art shown in FIG. 5 comprises a base member (81) and a worktable (82) mounted on the top of the base member (81). A project box (83) is mounted to the top of the worktable (82). A screen (84) is rotatably attached to the project box (83) and made of frosted glass. Multiple clamps (841) are mounted on the project box (83) around the screen (84) for securing a transparent film on the screen (84). A adjust knob (85) is rotatably mounted to the project box (83) for rotating the screen (84). A first adjust roller (86) is pivotally mounted to the worktable (82) for reciprocally moving the worktable (82) along an X-axis of the worktable (82) and a second adjust roller (87) is pivotally mounted to the worktable (82) for reciprocally moving the worktable (82) along a Y-axis of the worktable (82).

A light source (not shown) is mounted in the worktable (82) for projecting the outline of the workpiece on the worktable (82) to the project box (83) and show on the screen (84). The transparent film has a standard line (88) printed thereon and used to contrast with the outline of the workpiece for measuring.

For example, to measure the length relative to the X-axis, a transparent film with a standard line (88) is clamped the screen (84) by using the multiple clamps (841) and the workpiece is put on the worktable of the profile projector. The operator rotates the first adjust roller (86) to make a first side of the workpiece flush with the standard line (88) and make the linear scale (not shown) in the worktable show zero. Next, the operator rotates the first adjust roller (86) again to make a second side of the workpiece flush with the standard line (88) and real the data from the linear scale relative to the X-axis of the workpiece.

However, the standard line (88) usually has a width about 0.3 mm for an easy operation. However, with reference to FIG. 6, the width will cause a certain error when aiming the profile (9) of the workpiece at the standard line (88), that is, the operator will be of the opinion that the profile of the workpiece is aimed at the standard line (88) when the profile of the workpiece moved within the width of the standard line (88). Consequently, different operator has a different result of measuring.

For example, to measure the angle of profile of the workpiece, a transparent film with a standard line (88) is secured on the screen (84) by the multiple clamps (841). The operator adjusts the adjust knob (85) to rotate around the screen (84) and the rotating range of the screen (84) is measured by a rotary encoder (not shown) due to a series of scales on a periphery of the screen (84). The scales of the screen (84) are set zero when the standard line (88) flush with a datum of the profile of the workpiece after that the screen (84) is rotated again to make the standard line flush with another side of the profile of the workpiece and the operator can read the angle value of the profile of the workpiece by the series of scales on the periphery of the screen (84).

However, the width of the standard line will cause an error the same as the embodiment described above. Furthermore, the round screen (84) is made of frosted glass and has a certain error of the roundness of the screen (84). The error of the roundness of the screen (84) may influence the precision of the scales on the periphery of the screen (84). The errors of the roundness of the screen (84) and the scales on the periphery of the screen (84) are added up to influence the measure precision of the length measure apparatus.

The present invention has arisen to mitigate and/or obviate the disadvantages of the conventional length measure apparatus and the method for measuring.

SUMMARY OF THE INVENTION

The main objective of the present invention is to provide an improved measure apparatus and the method for measuring that can overcome errors from the operator's vision and the measure apparatus.

To achieve the objective, the length measure apparatus and the method for measuring in accordance with the present invention transform an image from a lens set into a digital contrast image via a central processing unit. The CPU has multiple standard lines that are previously set therein. Multiple movement controllers control a movement of a selected standard line from the CPU relative to the digital contrast image. A movement value is output when the selected standard line flushes with a profile of the contrast image. The measure value is shown on a monitor when the CPU contrasts the movement of the selected standard line.

Further benefits and advantages of the present invention will become apparent after a careful reading of the detailed description with appropriate reference to the accompanying drawings.

DETAILED DESCRIPTION OF THE INVENTION

Figure 1:
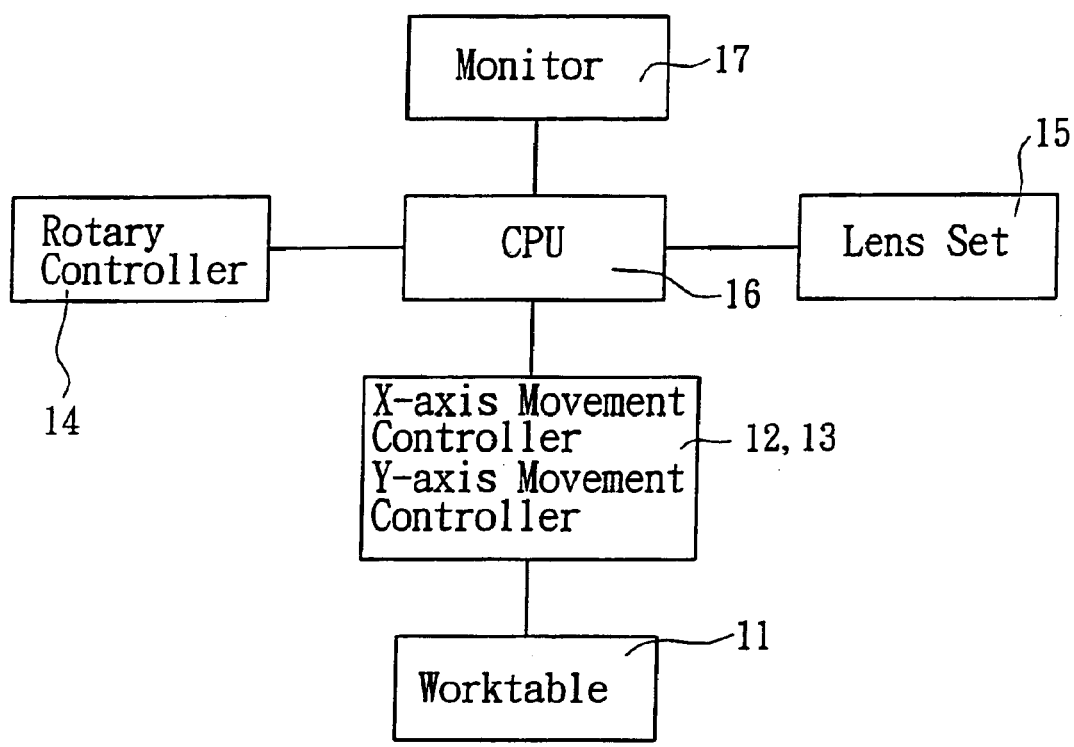
FIG. 1 is a configured chart of the length measure apparatus in accordance with the present invention.
Figure 2:
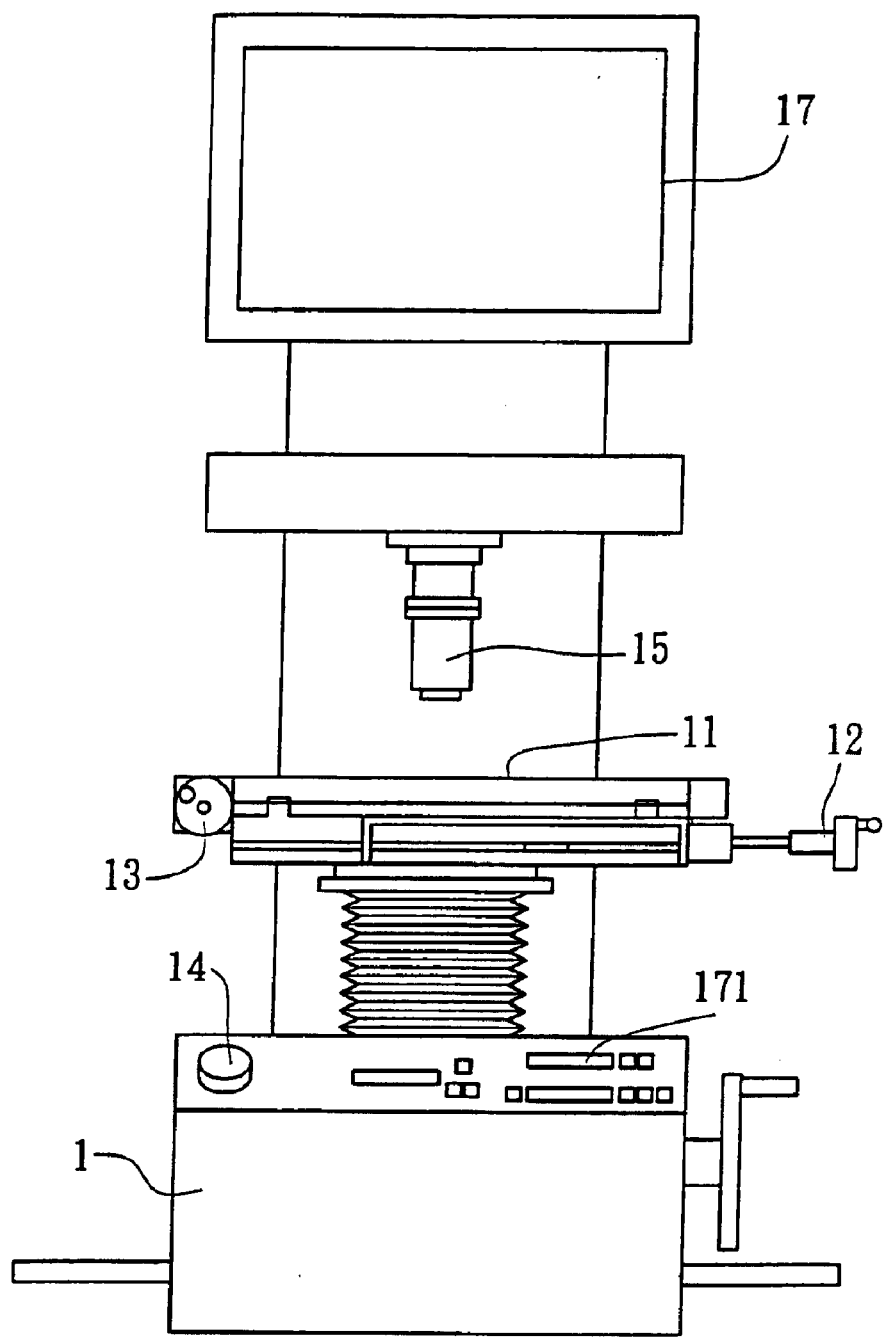
FIG. 2 is a front plan view of the length measure apparatus in accordance with the present invention.
Figure 3:
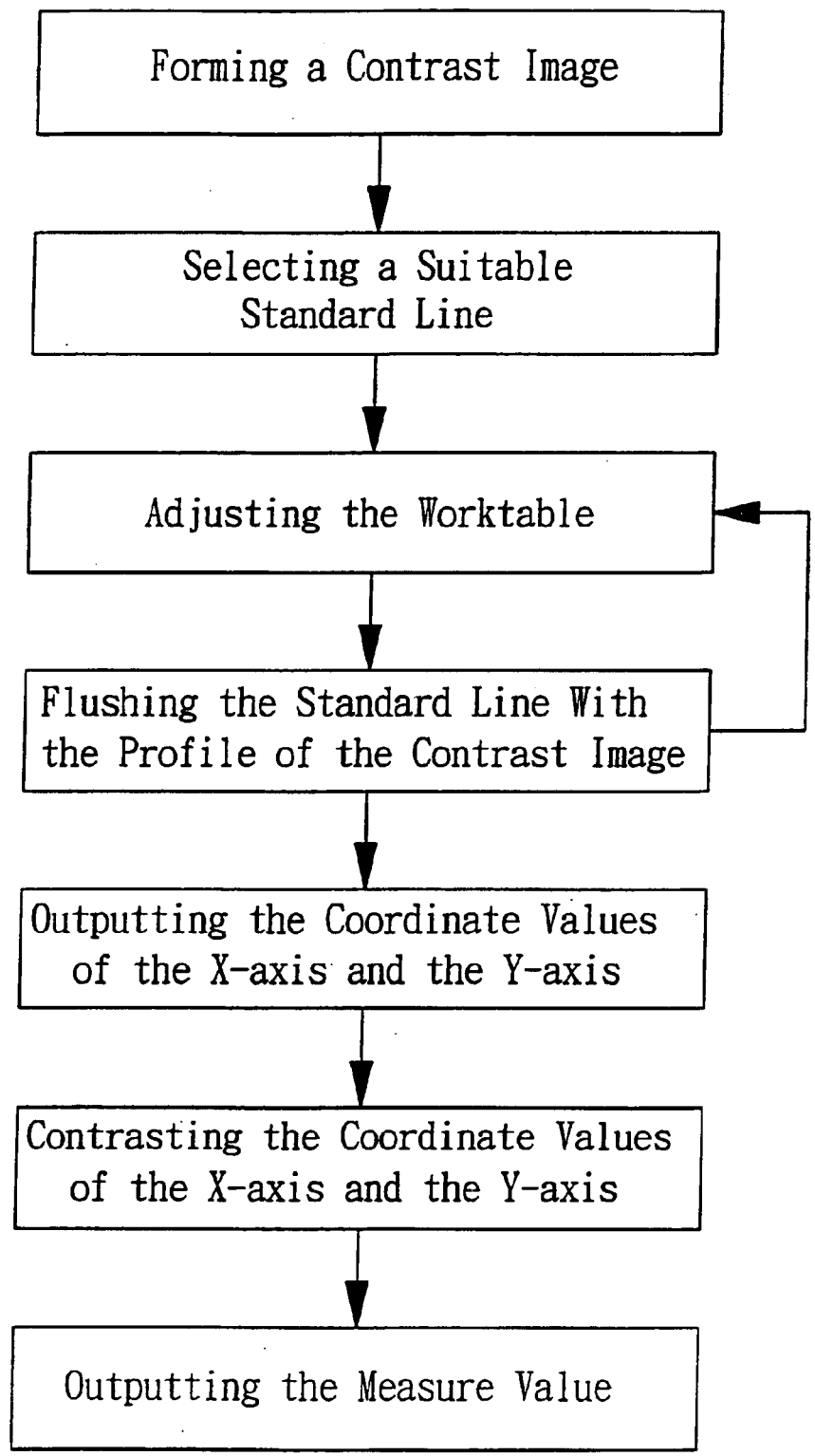
FIG. 3 is a flow chart of a length measure method of the length measure apparatus of the present invention.

Referring to the drawings and initially to FIGS. 1–3, a length measure apparatus in accordance with the present invention comprises a base member (1) and a worktable (11) moveably mounted on the base member (1). An X-axis movement controller (12) is mounted to the worktable (11) for controlling the movement of the worktable (11) relative to the X-axis of the worktable (11) and a Y-axis movement controller (13) is mounted to the worktable (11) for controlling the movement of the worktable (11) relative to the Y-axis of the worktable (11).

A lens set (15) is mounted to the length measure apparatus and located above the worktable (11) for collecting the images of the workpiece that is put on the worktable (11). In the preferred embodiment of the present invention, the lens set (15) is a CCD or a CMOS image collect module.

A central processing unit (CPU) (16, not shown) in received in the base member (1) and electrically connected to the lens set (15) for executing a digital process to the image of the workpiece and forming a contrast image. Multiple digital standard lines are previously set in the CPU (16).

A monitor (17) is mounted on the length measure apparatus of the present invention and electrically connected to the CPU (16). The monitor (17) shows a corresponding one of the multiple standard lines of the CPU (16) and the contrast image of the workpiece. The monitor (17) further includes a display panel (171) for showing the measure result. In the preferred embodiment of the present invention, the display panel (171) is mounted to the base member (1).

A rotary controller (14) is mounted on the base member (1) and electrically connected to the CPU (16). The rotary controller (14) is provided to circularly move the standard lines that are previously set in the CPU (16).

The measure method in accordance with the present invention comprises the following steps.

A. Forming a contrast image: the CPU (16) transforms the image from the lens set (15) into a digital contrast image that is shown on the monitor (17).

B. Selecting a suitable standard line: the CPU (16) selects a suitable standard line from the multiple standard lines that are previously set in the CPU (16) in accordance with the measure need and the selected standard line is shown on the monitor (17).

C. Adjusting the worktable: the X-axis movement controller (12) and the Y-axis movement controller (13) are respectively adjusted to make the worktable (11) being moved relative to the X-axis and the Y-axis of the worktable (11). The lens set (15) continually collects the image from the workpiece to make the contrast image moved relative to the selected standard line when the workpiece is moved due to a moving worktable.

D. Flushing the standard line with the profile of the contrast image: the CPU (16) detects and changes the color of the selected standard line and the flushed contrast image of the workpiece when the selected standard line flushes with a first side of the contrast image of the workpiece to make the operator clearly differentiate via the monitor (17).

E. Outputting the coordinate values of the X-axis and the Y-axis: the CPU (16) reads the values from the linear scales of the X-axis and the Y-axis and sets the two linear scales to be zero when the selected standard line flushes with the first side of the contrast image of the workpiece.

F. Contrasting the coordinate values of the X-axis and the Y-axis: repeating step D and E, the CPU (16) reads the values from the linear scales of the X-axis and the Y-axis again when the selected standard line flushes with a second side of the contrast image of the workpiece, and contrasts the values from the linear scales of the X-axis and the Y-axis in step D, wherein the first side and the second side of the contrast are opposite to each other.

G. Outputting the measure value: the measure value is shown on the display panel (171) and recorded in the CPU (16) after the CPU (16) contrasting the values from the linear scales of the X-axis and the Y-axis in step D and F.

The measure method of the present invention uses the digital contrast image and the digital standard line to detect the profile of the workpiece flushing with the standard line, and the CPU (16) to process the digital contrast image and the digital standard line. Consequently, the measure method in accordance with the present invention can effectively reduce the error from the operator's vision and the measure apparatus and enhance the precision of measure.

Figure 4:
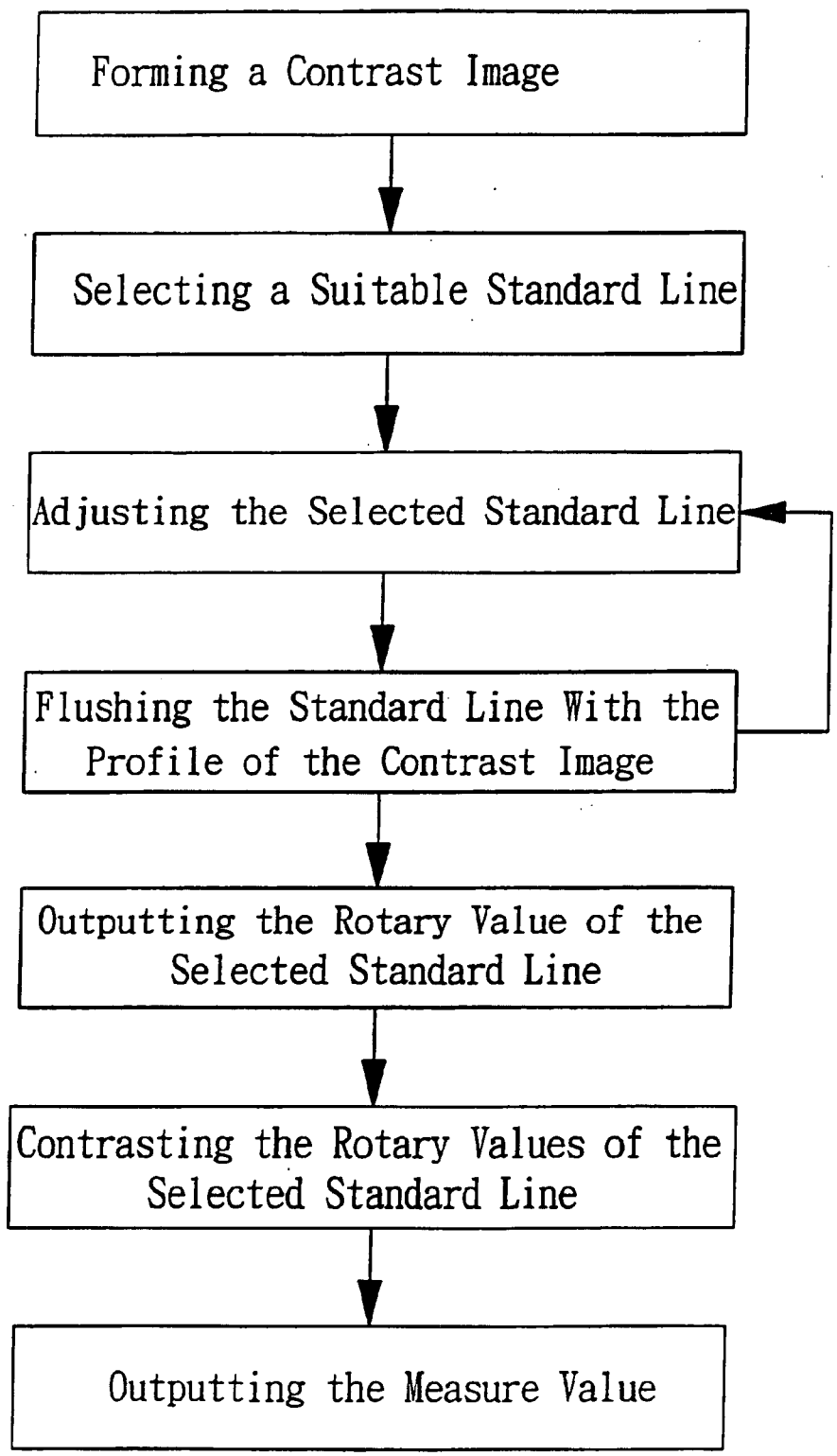
FIG. 4 is a flow chart of an angle measure method of the length measure apparatus of the present invention.
Figure 5:
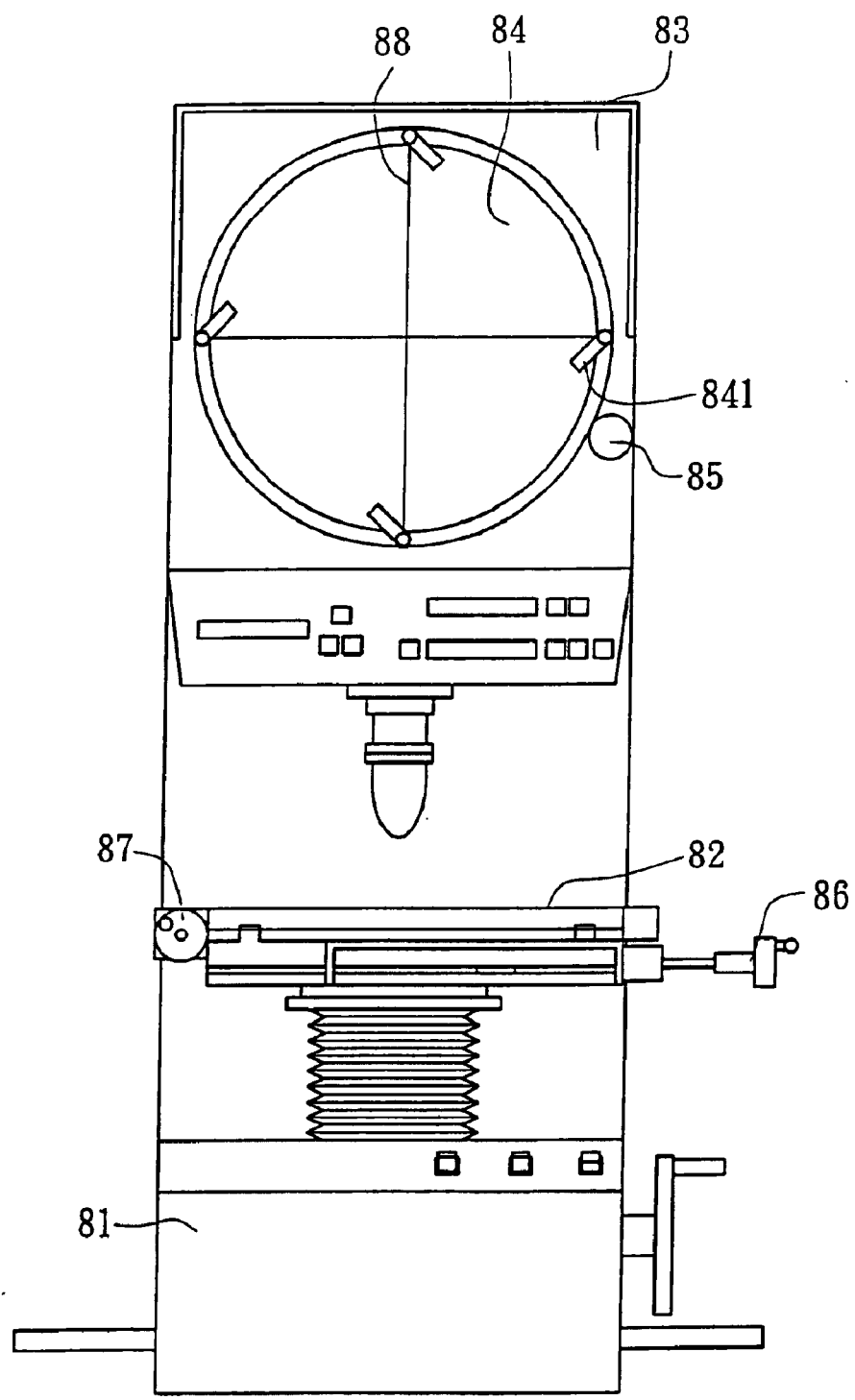
FIG. 5 is a front plan view of a conventional profile projector in accordance with the prior art.
Figure 6:
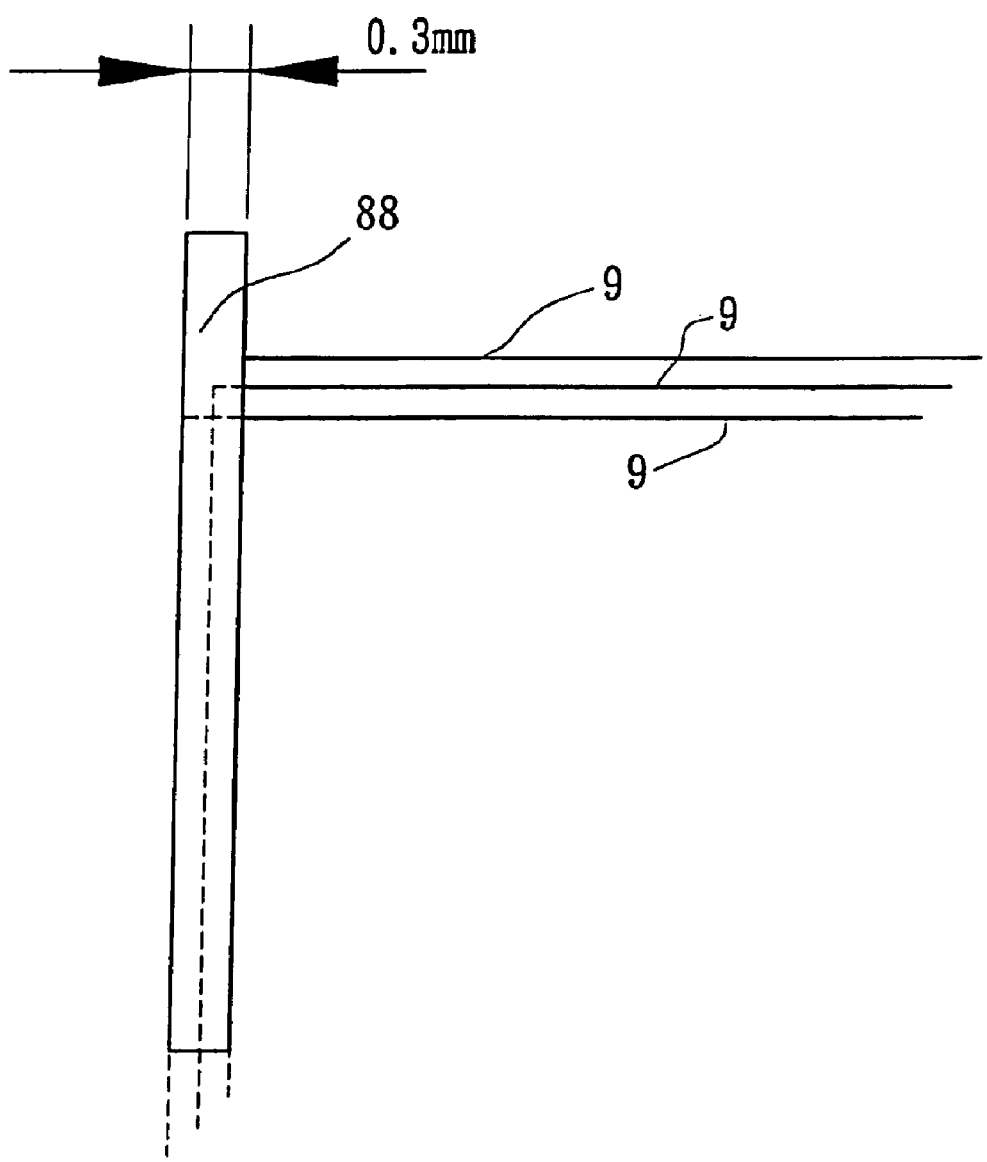
FIG. 6 is schematic view of the conventional profile projector that operator differentiates the standard line and the outline of the workpiece is overlapped or not by his/her vision.

With reference to FIGS. 1–2 and 4, the length measure apparatus of the present invention can further measure an angle formed by two adjacent sides of the workpiece. The measure method of angle is similar to the above measure method for length and comprises the following steps.

A. Forming a contrast image: the CPU (16) transforms the image from the lens set (15) into a digital contrast image that is shown on the monitor (17).

B. Selecting a suitable standard line: the CPU (16) selects a suitable standard line from the multiple standard lines that are previously set in the CPU (16) in accordance with the measure need and the selected standard line is shown on the monitor (17).

C. Adjusting the selected standard line: the selected standard line in the CPU (16) is circularly moved relative to the contrast image when operator adjusts the rotary controller (14).

D. Flushing the standard line with the profile of the contrast image: the CPU (16) detects and changes the color of the selected standard line and flushed contrast image of the workpiece when the selected standard line flushes with a first side of the contrast image of the workpiece to make the operator clearly differentiate via the monitor (17).

E. Outputting the rotary value of the selected standard line: the CPU (16) reads the rotary value of the selected standard line and sets the rotary value to be zero when the selected standard line flushes with the first side of the contrast image of the workpiece.

F. Contrasting the rotary value of the selected standard line: repeating step D and E, the CPU (16) reads the rotary value of the selected standard line again when the selected standard line flushes with a second side of the contrast image of the workpiece, and contrasts the rotary value in step D, wherein the first side and the second side of the workpiece form an angle.

G. Outputting the measure value: the measure value is shown on the display panel (171) and recorded in the CPU (16) after the CPU (16) contrasting the rotary values in step D and F.

The measure method of the present invention uses the digital contrast image and the digital standard line to detect the profile of the workpiece flushing with the standard line, and the CPU (16) to process the digital contrast image and the digital standard line. Consequently, the measure method in accordance with the present invention can effectively reduce the error from the operator's vision and the measure apparatus and enhance the precision of measure.

Although the invention has been explained in relation to its preferred embodiment, it is to be understood that many other possible modifications and variations can be made without departing from the spirit and scope of the invention as hereinafter claimed.

What is claimed is:

1. A measure method comprising the steps of:
   A. forming a contrast image: a CPU (central processing unit) transforming an image from a lens set into a digital contrast image;
   B. selecting a suitable standard line: the CPU selecting a suitable standard line from multiple standard lines that are previously set in the CPU in accordance with the measure need;

C. adjusting a worktable: an X-axis movement controller and a Y-axis movement controller being respectively adjusted to make the worktable being moved relative to an X-axis and a Y-axis of the worktable, the lens set continually collecting the image from the workpiece to make the contrast image moved relative to the selected standard line when the workpiece is moved due to a moving worktable;

D. flushing the standard line with the profile of the contrast image: the CPU detecting and changing the color of the selected standard line and flushed contrast image of the workpiece when the selected standard line flushes with a first side of the contrast image of the workpiece to make the operator clearly differentiate;

E. outputting the coordinate values of the X-axis and the Y-axis: the CPU reading the values from the linear scales of the X-axis and the Y-axis and sets the two linear scales to be zero when the selected standard line flushes with the first side of the contrast image of the workpiece;

F. contrasting the coordinate values of the X-axis and the Y-axis: repeating step D and E, the CPU reading the values from the linear scales of the X-axis and the Y-axis again when the selected standard line flushes with a second side of the contrast image of the workpiece, and contrasts the values from the linear scales of the X-axis and the Y-axis in step D, wherein the first side and the second side of the contrast are opposite to each other; and G. outputting the measure value: the measure value shown on a display panel and recorded in the CPU after the CPU contrasting the values from the linear scales of the X-axis and the Y-axis in step D and F.

2. The measure method as claimed in claim 1, wherein the digital contrast image and the selected standard line are shown on a monitor such that the operator can clearly differentiate on the monitor.

3. The measure method comprising the steps of:

A. forming a contrast image: a CPU (central processing unit) transforms an image from a lens set into a digital contrast image;

B. selecting a suitable standard line: the CPU selecting a suitable standard line from multiple standard lines that are previously set in the CPU in accordance with the measure need;

C. adjusting the selected standard line: the selected standard line in the CPU being circularly moved relative to the contrast image when operator adjusts the rotary controller;

D. flushing the standard line with the profile of the contrast image: the CPU detecting and changing the color of the selected standard line and flushed contrast image of the workpiece when the selected standard line flushes with a first side of the contrast image of the workpiece to make the operator clearly differentiate;

E. outputting the rotary value of the selected standard line: the CPU reading the rotary value of the selected standard line and setting the rotary value to be zero when the selected standard line flushes with the first side of the contrast image of the workpiece;

F. contrasting the rotary value of the selected standard line: repeating step D and E, the CPU reading the rotary value of the selected standard line again when the selected standard line flushes with a second side of the contrast image of the workpiece, and contrasts the rotary value in step D, wherein the first side and the second side of the workpiece form an angle; and G. outputting the measure value: the measure value being shown on a display panel and recorded in the CPU after the CPU contrasting the rotary values in step D and F.

4. The measure method as claimed in claim 3, wherein the digital contrast image and the selected standard line are shown on a monitor such that the operator can clearly differentiate on the monitor.

5. A length measure apparatus comprising:

a base member;

a worktable moveably mounted on the base member;

an X-axis movement controller mounted to the worktable for controlling the movement of the worktable relative to the X-axis of the worktable;

a Y-axis movement controller mounted to the worktable for controlling the movement of the worktable relative to the Y-axis of the worktable;

a lens set mounted to the measure apparatus and located above the worktable for collecting the image of the workpiece that is put on the worktable;

a CPU (central processing unit) (CPU) in received in the base member and electrically connected to the lens set for executing a digital process to the image of the workpiece and forming a contrast image, the CPU having multiple digital standard lines previously set therein;

a monitor mounted on the measure apparatus and electrically connected to the CPU, the monitor showing a corresponding one of the multiple standard lines of the CPU and the contrast image of the workpiece, the monitor including a display panel for showing the measure result; and a rotary controller mounted on the base member and electrically connected to the CPU, the rotary being provided to circularly the standard lines relative to the contrast image.

6. The measure apparatus as claimed in claim 5, wherein the lens set is a CCD image collect module.

7. The measure apparatus as claimed in claim 5, wherein the lens set is a image collect module.

* * * * *